United States Patent [19]

Kumasa et al.

[11] 3,929,893

[45] Dec. 30, 1975

[54] PROCESS FOR PREPARING CYCLOHEXADECENONE-5

[75] Inventors: Ikuzi Kumasa; Takeshi Yamamoto; Fumitaka Norose, all of Yokohama; Susumu Acutagawa, Tokyo; Toshio Yoshida, Yokohama; Akira Komatsu, Tokyo, all of Japan

[73] Assignee: Takasago Perfumery Co., Ltd., Tokyo, Japan

[22] Filed: Feb. 21, 1974

[21] Appl. No.: 444,596

Related U.S. Application Data

[63] Continuation of Ser. No. 213,718, Dec. 29, 1971, abandoned.

[30] Foreign Application Priority Data

Dec. 29, 1970 Japan............................. 46-126904

[52] U.S. Cl.... 260/586 R; 260/617 M; 260/DIG. 11
[51] Int. Cl.$^2$.................. C07C 45/00; C07C 29/00
[58] Field of Search..... 260/586 A, 617 M, DIG. 11

[56] References Cited
OTHER PUBLICATIONS

Marvell et al., *Tetra Letters*; No. 7, pp. 509–512, 1970.
Kosower et al., *J. Org. Chem.* Vol. 28, pp. 630–633, 1963.
House, *Modern Synthetic Reactors*, pp. 144–156, 1965.
Houben–Weyl *Methochem–Der. Org. Chem.* Vol. 5, part 3, pp. 620–621 (1962).
Horning et al., *Org. Syn. Cool.* Vol. 3, pp. 188–190, (1955).
Marvell et al., *Tetra. Letters*, No. 17, pp. 1341–1342, 1969.
Marcon, et al., *Chem. Abstracts*, Vol. 65, p. 624f, 1966.
Magndichian, *Org. Syn.*, pp. 559–561, 1957.
Sandter et al., *Org. Functional Group Reactions*, pp. 20–21 (1968).

*Primary Examiner*—Norman Morgenstern
*Attorney, Agent, or Firm*—Sughrue, Rothwell, Mion, Zinn & Macpeak

[57] ABSTRACT

The novel compound, cyclohexadecenone-5 is prepared by reacting cyclododecanone with chlorinating agent to provide α-chloro-cyclododecanone-1, reacting the α-chloro-cyclododecanone-1 with vinyl magnesium chloride to provide 1,2-divinylcyclododecanol-1, and decomposing the 1,2-divinylcyclododecanol-1 with heat to cyclohexadecenone-5.

7 Claims, No Drawings

PROCESS FOR PREPARING CYCLOHEXADECENONE-5

This application is a continuation of application Ser. No. 213,718, filed Dec. 29, 1971, now abandoned.

BACKGROUND OF THE INVENTION

The present invention relates to a novel compound, cyclohexadecenone-5, and a process for producing the novel compound, which has a musk-like odor and which, therefore, is useful in the preparation of a great variety of perfume compositions containing said novel compound, cyclohexadecenone-5.

DESCRIPTION OF THE PRIOR ART

Among compounds having a musk-like odor, the most valuable ones are natural muscone and natural civetone. The former being a large ring ketone having 15 carbon atoms and the latter being a large ring ketone having 17 carbon atoms. However, because they are quite expensive, various attempts for synthesizing these compounds and discovering substitutes for these compounds have been made, and a result thereof it has been confirmed that large ring ketones having musk-like odor have from 14 to 19 carbon atoms.

Although such large ring ketones are excellent compounds as musk perfumes, the production of such compounds is expensive due to the difficulty of production and the fact that the yield is low. Accordingly, various investigations have been made to discover substituts having other structures for such large ring ketones for use in musk perfumes, for example, aromatic nitromusks, indane musks, tetralin musks and isochroman musks have been employed as musk perfumes.

SUMMARY OF THE INVENTION

As a result of various investigations to provide at low cost musk perfume compositions containing large ring ketones, the inventors have found that the novel compound, cyclohexadecenone-5 having 16 carbon atoms and an unsaturated bond, represented by the formule

  (I)

has a musk-like odor, and also that the compound can be readily prepared by using as the starting material cyclododecanone which is recently available as petrochemical products. Among large ring ketones having 16 carbon atoms, only cyclohexadecenone-8 and cyclohexadecanone have hitherto been reported.

The primary object of this invention is, therefore, to provide cyclohexadecenone-5 having a musk-like odor.

Another object of this invention is to provide a process for producing cyclohexadecenone-5 profitably in industry.

Still other object of this invention is to provide an excellent musk perfume composition containing cyclohexadecenone-5 as the main component.

Other objects of this invention will become apparent from the following descriptions.

DETAILED DESCRIPTION OF THE INVENTION

According to the process of this invention, cyclohexadecenone-5 is produced by the following reaction formulae:

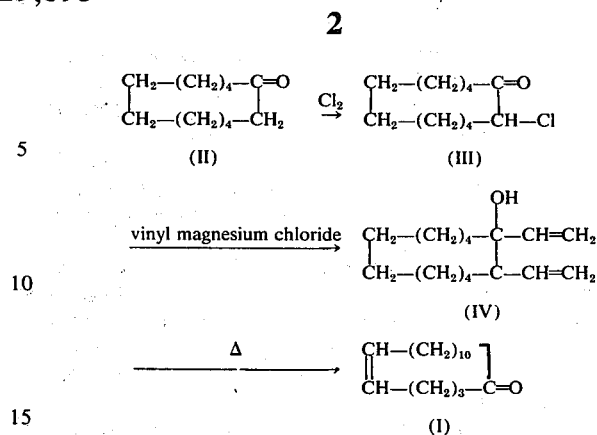

According to the process of this invention, cyclohexadecenone-5(I) is obtained by reacting cyclododecanone (II) with chlorinating agent to provide α-chloro-cyclododecanone-1 (III), reacting the product (III) with vinyl magnesium chloride to provide 1,2-divinyl-cyclododecanol-1 (IV), and decomposing 1,2-divinyl-cyclododecanol-1 with heat to provide cyclohexadecenone-5.

The chlorination to produce α-chloro-cyclododecanone-1 (III) from cyclododecanone (II) is carried out by a chlorination method capable of chlorinating the α-position of the ketone, for example, by a method in which chlorine gas is directly reacted with the compound (II) or a method in which cupric chloride is reacted with the compound (II) in dimethylformamide (cf., e.g., *Journal of Organic Chemistry*; Vol. 28, 630 (1963)). In particular, it is preferred to react chlorine gas in an amount of 1–1.2 times the stoichiometric amount at a temperature of 0°–40°C, preferably at about 25°C using tetrahydrofuran as the solvent.

In the case of the chlorination with cupric chloride, one mole of cyclododecanone is reacted with 2.4 moles of cupric chloride at 85°C using dimethylformamide as a solvent.

Vinyl magnesium chloride used in the reaction of this invention may be prepared in tetrahydrofuran as solvent according to the process described in the specification of British Pat. No. 777,158.

The reaction of producing 1,2-divinylcyclododecanol-1 (IV) from α-chloro-cyclododecanone-1 (III) is conducted in accordance with the general Grignard's reaction conditions using the vinyl magnesium chloride prepared by the above process. Ketone radical is more reactive than chloro radical for the Grignard reagent, and so one mole of the Grignard reagent is first reacted at room temperature over a one hour and then one mole of the Grignard reagent is reacted at about 60°C for a few hours, e.g. for 2 to 3 hours, while agitating. Then the reaction product is treated with aqueous solution of ammonium chloride under ice-cooling to produce 1,2-divinylcyclododecanol-1 1 (IV).

1,2-divinylcyclododecanol-1 (IV) may be converted to cyclohexadecenone-5 (I) by thermal decomposition according to the oxy-Cope rearrangement described by E. N. Marvell and W. Whalley (Tetrahedron Letters No. 7, PP.509–512, (1970) ). The thermal decomposition to produce cyclohexadecenone-5 (I) from 1,2-divinylcyclododecanol-1 (IV) is preferably carried out in an inert gas atmosphere by heating 1,2-divinylcyclododecanol-1 to 180°–250°C., preferably 210°–220°C. for about 3 hours in the lack of a solvent or in a proper solvent, such as cyclododecatriene.

Cyclohexadecenone-5 (I) prepared by the present invention has floral-sweet musk-like odor with an ambergris-like undertone (ambergris is a typical animal-note perfume compound like musk compound), is more animal-like than many other synthetic musk compounds and has good long-lasting and fixative qualities. Thus perfume compositions containing cyclohexadecenone-5 of this invention as an olfactory and fixative ingredient may be used per se or may be incorporated into materials such as cosmetic creams, lotions, powders, soaps, detergents and aerosols or other toilet goods such as shampoos.

The process for producing the novel compound, cyclohexadecenone-5 of this invention will now be described practically by the following examples.

EXAMPLE 1

Preparation of α-chloro-cyclododecanone-1 (III):

i. Into a 500 milliliter four-necked flask were placed 75 g of cyclododecanone and 75 ml of tetrahydrofuran, and the mixture was stirred by blowing chlorine gas (1.2 mole times that of the cyclododecanone) into the mixture for 2 hours. The reaction temperature was maintained at 20°–30° by external cooling. The reaction product was washed with water and then with an aqueous sodium carbonate solution, and then subjected to rectification to provide 92.7 g of a fraction which distilled at 119°C/ 1 mmHg with a yield of 91%

IR absorption spectra : 1715 cm$^{-1}$ (showing >C=O ) and 718 cm$^{-1}$ (showing C-Cl).

MS spectrum : Primary peak 216 ($C_{12}H_{21}OCl$)

Elementary analysis as $C_{12}H_{21}OCl$:

Calculated : C 66.51%, H 9.70% Cl 16.40%.

Found: C 66.43%, H 9.68% Cl 16.38%.

Melting point: 58.9°C.

ii. Into 300 ml of dimethylformamide there was dissolved 24.5 g (1.44 moles) of cupric chloride dihydrate at 70°C and after further adding to the solution 30.6 9 (0.72 moles) of lithium chloride followed by stirring, 109.2 g (0.6 moles) of cyclododecanone was added dropwise to the mixture at 85°C over a one hour period. Then, after stirring the mixture for 2 hours, the reaction product was treated with ice water, extracted with toluene, and the toluene extract was distilled to provide 109 g (85%) of a fraction which distilled between 133°–135°C/2 mmHg.

EXAMPLE 2

Preparation of 1,2-divinylcyclododecanol-1 (IV):
Into 500 millilitter four-necked flask there was placed 100 ml of a tetrahydrofuran solution of 36.4 g (0.2 moles) of α-chloro-cyclododecanone-1, and then 0.24 moles of vinyl magnesium chloride preliminary prepared in tetrahydrofuran as a solvent was added dropwise to the solution at 20°C over a period of 30 minutes under a nitrogen gas atmosphere to cause the reaction. To the reaction product solution which was obtained there was added a catalylic amount of aluminum isopropoxide (1 g). Then 0.26 moles of vinyl magnesium chloride was added dropwise to the mixture at 60°C over a 1 hour period. After stirring the reaction system for a further 2 hours, the reaction product thus obtained was added to an aqueous solution of ammonium chloride under ice-cooling. Then the product was extracted with diethylether. By subjecting the diethyl ether extract to a fractional distillation under reduced pressure, 3.7 g of a fraction which distilled between 138°–140°C/0.5 mmHg was obtained with a yield of 95%.

IR absorption spectra: 3355 cm$^{-1}$ and 1115 cm$^{-1}$ (showing tertiary OH) and 3065, 1645, 990 and 905 cm$^{-1}$. (showing —CH=CH$_2$).

MS spectra: Primary peak m/e 236 ($C_{16}H_{28}O$); P-$H_2O$; 218 ($C_{16}H_{26}$).

Elementary analysis as $C_{16}H_{28}O$:

Calculated: C 83.06% H 11.87%.

Found: C 82.98 %, H 11.60 %.

EXAMPLE 3

Preparation of cyclohexadecenone-5 (I):

Into a 100 milliliter four-necked flask there was placed 3.4 g of 1,2-divinylcyclododecanol-1 and 30 g of cyclododecatriene as a solvent and then the mixture was heated to 210°–220°C for 3 hours under a nitrogen gas atmosphere. The reaction product was passed through a column chromatograph packed with silica gel to catch the reaction product and the reaction product thus absorbed was developed. After distilling off cyclododecatriene and hydrocarbons as side products from the elate, the reaction product was extracted with n-hexaneethyl acetate (9 : 1) solvent. By distilling the extract, 2.3 g of a fraction was obtained with a yield of 71%.

IR absorption spectra: 1702 cm$^{-1}$ (showing >C=O) and 1650, 962 and 720 cm$^{-1}$ (showing —CH=CH—).

MS Spectra:  Primary peak m/e 236 ($C_{16}H_{28}O$)
Base ion peak  55 ($H_2C=CH—C\ \ O$)

NMR (60 Hz, CCl$_4$, TMS)

—CH$_2$—  1.34 ppm

—CH$_2$>C=O, —CH$_2$—CH=CH—CH$_2$—  2.24—2.02 ppm
—CH$_2$

—CH=CH—5.42 ppm

Elementary analysis as $C_{16}H_{28}O$:

Calculated: C 83.06%, H 11.87%.

Found: C 82.95%, H 11.60%.

Boiling point: 155°C/2 mmHg.

Melting point of the semicarbazone: 176°C.

What is claimed is:

1. A process for preparing cyclohexadecenone-5 consisting of:
   1. reacting cyclododecanone with a chlorinating agent to produce α-chloro-cyclododecanone-1;
   2. reacting 1 mole of the resulting α-chloro-cyclododecanone-1 with 1 mole of vinyl magnesium chloride at room-temperature for 1 hour in tetrahydrofuran as a solvent and thereafter adding a catalytic amount of aluminum isopropoxide followed by reacting the resulting reaction product with 1 more mole of vinyl magnesium chloride at about 60°C. for from 2 to 3 hours;
   3. hydrolyzing the reaction product of step (2) to produce 1.2-divinyl cyclododecanol-1; and
   4. thermally rearranging said 1,2-divinylcyclododecanol-1 by heating at a temperature of from 180°–250°C. under an inert gas atmosphere to produce said cyclohexadecenone-5.

2. The process as claimed in claim 1 wherein said α-chloro-cyclododecanone-1 is prepared by reacting cyclododecanone with chlorine gas at a temperature from 0° to 40°C. using tetrahydrofuran as a solvent, the amount of chlorine gas used in the reaction being from 1 to 1.2 times the stoichiometric amount of chlorine gas required to produce α-chloro-cyclododecanone-1.

3. The process of claim 1 wherein said α-chloro-cyclododecanone-1 is prepared by reacting 1 mole of cyclododecanone with about 2.4 moles of cupric chloride at 85°C using dimethylformamide as a solvent.

4. The process of claim 2 wherein the temperature of chlorination is maintained at 20°–30°C.

5. The process of claim 1 said hydrolyzing is conducted by treating the reaction product of said α-chloro-cyclododecanone-1 and said vinyl magnesium chloride with an aqueous solution of ammonium chloride under ice-cooling.

6. The process of claim 1 said 1,2-divinylcyclododecanol-1 is thermally rearranged at 210°–220°C for 3 hours under an inert atmosphere using cyclododecatriene as a solvent.

7. The process of claim 6 wherein said inert atmosphere is an atmosphere of nitrogen.

* * * * *